Figure 1:
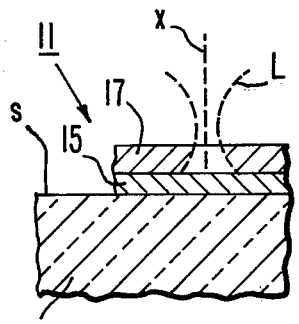

United States Patent [19]

Bell et al.

[11] 4,189,735
[45] Feb. 19, 1980

[54] RECORD PLAYBACK APPARATUS AND INFORMATION RECORD THEREFOR

[75] Inventors: Alan E. Bell, East Windsor; Robert A. Bartolini, Trenton; Rabah Shahbender; Brown F. Williams, both of Princeton, all of N.J.

[73] Assignee: RCA Corporation, New York, N.Y.

[21] Appl. No.: 881,023

[22] Filed: Feb. 24, 1978

[51] Int. Cl.² .................. G01D 15/24; G01D 15/10
[52] U.S. Cl. .................. 346/135.1; 346/76 L
[58] Field of Search .................. 346/76 L, 135

[56] References Cited

U.S. PATENT DOCUMENTS

| | | | |
|---|---|---|---|
| 3,665,483 | 5/1972 | Becker et al. | 346/76 L X |
| 4,000,492 | 12/1976 | Willens | 346/135 X |
| 4,023,185 | 5/1977 | Bloom et al. | 346/135 |
| 4,097,895 | 6/1978 | Spong | 346/76 L X |
| 4,101,907 | 7/1978 | Bell et al. | 346/76 L X |

Primary Examiner—George H. Miller, Jr.

Attorney, Agent, or Firm—E. M. Whitacre; J. S. Tripoli; J. E. Roehling

[57] ABSTRACT

Playback apparatus, providing a playback beam of light, effects signal recovery, from an information record, with a high signal-to-noise ratio. An information record, suitable for use with such playback apparatus, comprises a flat major surface of a disc-shaped foundation coated with a layer of a thermally conductive material overlaid with a layer of a thermally insulating material. Information storage is effected in a layer of material (e.g., platinum-cobalt), highly absorptive for light of a frequency supplied by a recording laser, which layer overlies the insulating layer. By proper choice of thicknesses for the insulating and the conductive layers, absorptive layer sensitivity to the intensity of the playback beam of lights is effectively reduced to enable record playback at high playback beam intensity levels without damage thereto. Where the foundation is formed of a thermally conductive material, the layer of thermally conductive material may be dispensed with.

12 Claims, 6 Drawing Figures

RECORD PLAYBACK APPARATUS AND INFORMATION RECORD THEREFOR

The present invention relates generally to optical record playback apparatus and information records therefor, and more particularly, to playback apparatus employing a high intensity level playback beam of light and information records which are able to sustain, without damage, the intensity level of the playback beam.

In the prior art, optical recording methods have been proposed in which light from a laser is focused upon the surface of a recording medium with sufficient intensity to cause a disturbance of surface material at the region of incidence. By suitably controlling the intensity of the focused light in accordance with information to be recorded while relative motion is established between the recording medium and the focused light spot, an information representative pattern of disturbed surface regions and intervening undisturbed surface regions may be formed in the surface of the recording medium.

In playback operations, a light beam is focused upon the information track of a rotating information record of the above-described type. The playback beam has a constant intensity at a level insufficient to effect a disturbance of the disc coatings, and is of a frequency substantially corresponding to that at which the disturbed and the undisturbed surface regions affect the playback beam in respectively different ways. A detector, positioned to receive light reflected from the successive regions of the information track as they pass through the path of the focused light, develops a signal representative of the recorded information.

In accordance with the principles of the present invention, where a desired signal-to-noise ratio for information recovery from an information record is to be achieved, proper adjustment of the intensity of the playback beam easily yields the desired signal-to-noise ratio. Playback of the same information record at different intensity levels for the playback beams yields respectively different signal-to-noise ratios of the recovered information. Illustratively, information reproduction for broadcast purposes requiring signal-to-noise ratios in excess of 40 db, and information reproduction for non-broadcast purposes requiring a less stringent signal-to-noise ratio for satisfactory operation may both be easily satisfied by playback of the same information record at different intensity settings of the playback beam.

In further accordance with the principles of the present invention, the sensitivity of an information record, suitable for use with playback apparatus embodying the principles of the present invention, to the intensity of the playback beam of light is desirably reduced to enable record playback at high playback beam intensity levels without damage thereto. The achievement of a reduced playback sensitivity, in accordance with the present invention, is a result of an inefficient coupling of energy from the playback light beam into the light sensitive surface of the record. This inefficient coupling of energy from the incident beam can be achieved by a reduction in the level of absorption of light from the playback beam into the light sensitive recording layer (i.e., low optical efficiency), and can also be achieved by an increase in the rate of heat transmission from that light sensitive layer into the substrate (i.e., low thermal efficiency of the recording process). Such thermal inefficiency of energy coupling may be enhanced by construction of the recording medium in the form of a rigid substrate having a flat surface, exhibiting high thermal diffusivity (i.e., presenting a significant heat sink to the light sensitive layer), with a thin layer of material, highly absorptive at the frequency of the recording beam, overlying the substrate surface. With a high level of heat transfer to the substrate through the thin absorptive layer, the recording beam intensity required to elevate the temperature of the absorptive layer material to that necessary for effecting a disturbance thereof is significantly increased.

Pursuant to one aspect of the present invention, the reduction of the thermal efficiency of energy coupling into the absorptive layer, realizable through the use of a substrate exhibiting high thermal diffusivity, is still realizable when the selected substrate is formed of materials exhibiting relatively low thermal diffusivity. This is accomplished, in accordance with the principles of the present invention, by interposing a thin layer of material, having a thermal diffusivity constant which is significantly larger than the thermal diffusivity constant of the substrate, coated with a thin layer of an insulating material between the absorptive layer and the substrate. This composite structure enables the economical manufacture of a foundation substrate from materials having the desired properties (e.g., rigidity, flatness of surface, long-term stability and shape retention, low cost of manufacture, etc.) with little regard to the thermal properties thereof, while presenting, through proper choice of thicknesses for the layer of material and the insulating coating, a heat sink for the absorptive layer.

In accordance with an illustrative embodiment of the present invention, a surface of a glass foundation having a disc shape is processed so as to form a polished flat surface, which is then coated with a thin layer of metal (e.g., aluminum), which is, in turn, coated with a thermally insulating layer of material (e.g., silicon dioxide or polystyrene) having a thermal diffusivity constant which is small relative to the diffusivity constant of the metal layer, to establish a composite substrate exhibiting overall high thermal diffusivity. This insulating layer is then coated with a layer of material (e.g., platinum-cobalt or manganese-bismuth) which is highly absorptive at the light frequency of a monochromatic light source available for recording use (e.g., a HeNe laser providing an output at a wavelength of 6328 angstrom units).

The coated disc structure, formed in the above-described manner, constitutes a record blank which may be utilized in conjunction with a suitably controlled light beam source of the appropriate frequency to effect, during playback, coupling of energy from the light beam into the absorptive layer at beam intensity levels which are significantly higher than those intensity levels required to effect recording on the absorptive layer in the absence of the metal layer.

In the prior art relating to optical disc records (e.g., U.S. Pat. No. 3,665,483—Becker et al.), the interposition of a heat reflective layer between a substrate and a layer of energy-absorbing material, in order to eliminate destructive heat dissipation in the substrate, has been proposed. While the thermal diffusivity constant for the material suggested for the heat reflective layer (e.g., $SiO_2$) is larger than the thermal diffusivity constant for the material suggested for the substrate (e.g., mylar), and therefore tends to effect a slight decrease in the sensitivity of the record blank, it is insufficient to prevent damage to the record blank by the playback beam intensities contemplated for this invention. It will be appreciated that the principles of the present invention, in contrast to the above-mentioned prior art, have as their aim the achievement of a substantial decrease in the sensitivity of a record blank to enable record playback at high playback beam intensities.

The interposition of an insulating layer between a light sensitive layer and a substrate, in a record blank, to increase the sensitivity of the record blank, has been previously discussed in a copending application—Bell, et al., Ser. No. 796,670 filed May 13, 1977.

Figure 2:
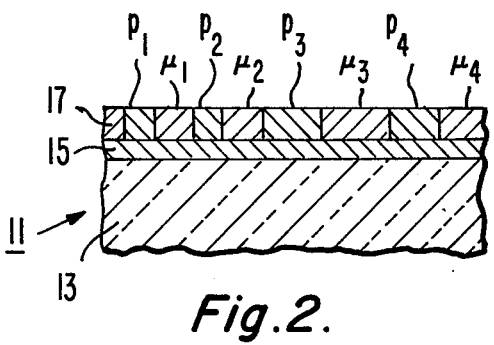
Figure 3:
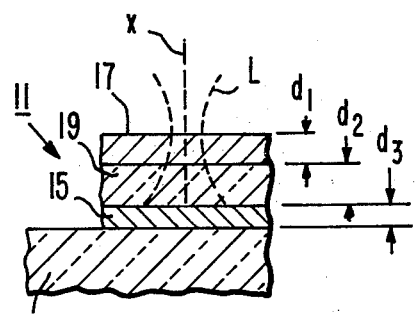
Figure 4:
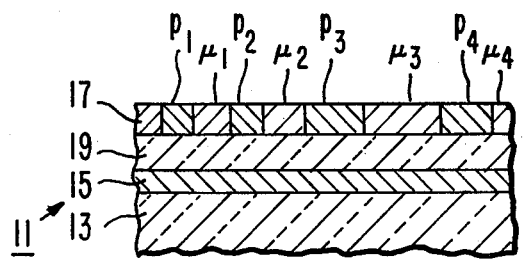
Figure 5:
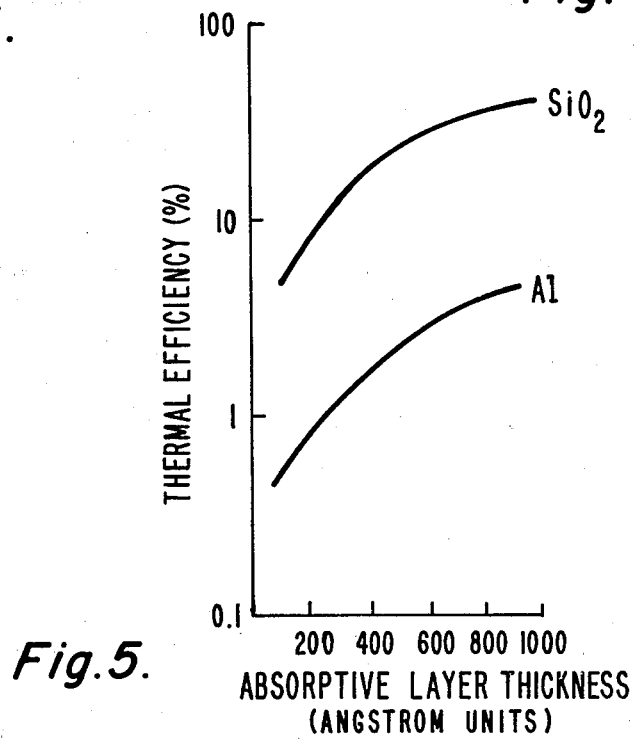
Figure 6:
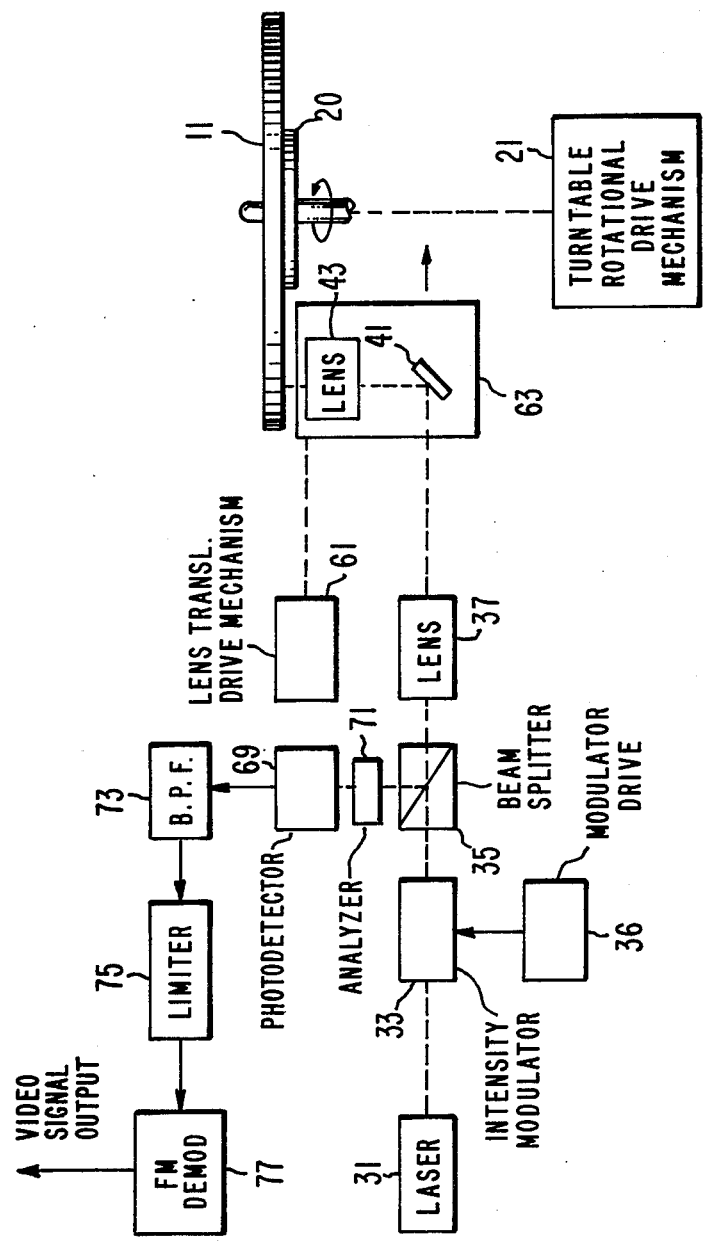

In the accompanying drawing:

FIG. 1 provides a cross-sectional view of a portion of a recording medium, exhibiting a substrate construction in accordance with one embodiment of the present invention;

FIG. 2 illustrates a cross-sectional view of a portion of the information track of an information record formed from a recording medium of the type shown in FIG. 1 pursuant to the principles of the present invention;

FIG. 3 provides a cross-sectional view of a portion of a recording medium, exhibiting a substrate construction in accordance with another embodiment of the present invention;

FIG. 4 illustrates a cross-sectional view of a portion of the information track of an information record formed from a recording medium of the type shown in FIG. 3 pursuant to the principles of the present invention;

FIG. 5 provides a graph of the relationship between thermal efficiency and different substrate materials for selected values of absorptive layer thickness in a recording medium; and FIG. 6 provides a representation, partially in block diagram form, of optical playback apparatus suitable for use in recovery of recorded information from a record of the type shown in FIG. 2.

In FIG. 1, a cross-sectional view of a portion of a record blank 11, formed for use in an optical recording system, shows the construction of a recording medium pursuant to an illustrative embodiment of the present invention. The record blank 11 includes a foundation 13, which is illustratively formed in the shape of a disc, a major surface s which is processed to be polished and flat. Foundation 13 is formed of a material, such as glass, which may be conveniently processed to achieve the desired surface properties.

Overlying the surface s of the foundation 13 is a thin layer 15 of a material exhibiting a high thermal conductivity. The conductive layer 15 may be formed from a metal, such as aluminum, deposited on the surface s by an evaporation process. Overlying the conductive layer 15 is a thin layer 17 which is light absorptive at least over a given portion of the light spectrum. Illustratively, the absorptive layer is formed of a 500 Å thick layer of a metal such as platinum-cobalt (PtCo) deposited on the conductive layer 15 by an evaporation process.

An advantage of the use of a conductive layer 15 between the absorptive layer 17 and the foundation 13 will be recognized by consideration of the effect achieved when a light beam L (of a frequency in the aforementioned given portion of the spectrum) is directed along an axis x normal to the surface of the absorptive layer 17. A large portion of the heat generated by absorption of the incident light in the absorptive layer 17 is not retained as would occur in the absence of the conductive layer 15, but rather is largely transferred to the foundation 13 due to the high rate of heat transmission through the conductive layer 15. During the recording process, when it is desired to effect surface material disturbance in response to recording light exposure, this increase of heat transmission into the interior of the recording medium decreases the coupling of energy from the recording light beam into the surface material thereby reducing the sensitivity of the record blank to light intensity.

When the intensity of the focused light beam L is of sufficient magnitude, the material comprising the absorptive layer 17 is evaluated to a temperature which effects a disturbance therein, forming a disturbed region in the surface of the record blank 11. With suitable modulation of the intensity of the beam L in accordance with a recording signal, as successive regions of the record blank 11 pass through the beam path, an information track may be formed comprising spaced disturbed regions in areas of the absorptive layer which have been subjected to the high intensity beam exposure, separated by undisturbed regions of the absorptive layer (that were not subject to such high intensity beam exposure).

FIG. 2 illustrates a portion of an information record where the record blank 11 of FIG. 1 is subjected to such controlled exposure. As shown in cross-section in FIG. 2, the information track comprises a succession of spaced disturbed regions $p_1$, $p_2$, $p_3$, $p_4$, separated by regions $u_1$, $u_2$, $u_3$, $u_4$ in which the surface of the absorptive layer 17 is undisturbed.

The characteristic length for diffusion of heat (i.e., thermal diffusion length) for any given solid material can be readily evaluated as a function of the thermal diffusivity constant $\kappa$ of the material and the elasped time $\tau$ since the release of the heat energy. One such calculation for platinum-cobalt indicates that for a 50 ns exposure to a recording beam the thermal diffusion length l (where $l=\sqrt{\kappa\tau}$) is approximately one micron. Since the thickness of the absorptive layer of a disc record, such as the record of FIG. 1, is usually of the order of 500 Å, the temperature rise in such a layer is greatly influenced by the thermal characteristics of the substrate.

Through choice of thickness for the conductive layer 15, the thermal conductivity characteristics of the composite substrate, comprising glass foundation 13 and conductive layer 15, can be made to vary within a range defined between limits imposed by the thermal conductivity characteristics of the materials forming the composite substrate. A more detailed discussion of these characteristics as they relate to a preferred embodiment of the present invention is included below.

While the embodiment of the invention illustrated in FIG. 1 is adequate in providing the desired decrease in record blank sensitivity, control over the conductive layer thickness, from a manufacturing point of view, is not a simple process. A preferred embodiment of the present invention, described below, is better adapted to a simpler manufacturing process due to the relative ease of control over an added variable, namely the thickness of an insulating layer, and the formation of a thick conductive layer.

In FIG. 3, a cross-sectional view of a portion of a record blank 11, formed for use in an optical recording system, shows the construction of a recording medium pursuant to a preferred embodiment of the present invention. The record blank 11 includes a disc-shaped substrate 13, formed of a material, such as glass, and overlaid with a thin layer 15 of a high conductivity material such as aluminum. Overlying the conductive layer 15 is a layer 19 of material which is a heat insulator. Illustratively, the insulating layer 19 is formed of silicon dioxide deposited on the conductive layer 15 by an evaporation glow discharge process. Finally, overlying the insulating layer 19 is a thin layer 17 of material which is light absorptive at least over a given portion of the light spectrum. Illustratively, the absorptive layer 17 is in the form of a 500 Å thick layer of a metal such as platinum-cobalt (PtCo) deposited on the insulating layer 19 by an evaporation process.

An advantage of the use, in the illustrated preferred construction of the recording medium, of a conductive layer 15 and an insulating layer 19 between the absorptive layer 17 and the foundation 13 will be recognized by consideration of the effect achieved when a light beam L (of a frequency in the aforementioned given portion of the spectrum) is directed along an axis x normal to the surface of the absorptive layer 17. A large portion of the heat generated by absorption of the incident light in the absorptive layer 17 is not retained as would occur in the absence of the conductive layer 15, but rather is largely "lost" in the form of heat in the foundation 13 due to the high rate of heat transmission through both the insulating layer 19 and the conductive layer 15. Where it is desired to effect material disturbances in response to recording light exposure, this increase of heat transmission losses into the interior of the recording medium decreases the coupling of energy from the recording light beam into the surface material thereby reducing the sensitivity of the record blank to light intensity. By controlling the thickness of insulating layer 19 relative to the thickness of conductive layer 15 the rate of thermal conduction between the absorptive layer 17 and the foundation 13 may be readily controlled.

When the intensity of the focused light beam L is of sufficient magnitude, material of the absorptive layer 17 is elevated to a temperature which affects a disturbance therein, forming a disturbed region in the surface of the record blank 11. With suitable modulation of the intensity of the beam L in accordance with a recording signal, as successive regions of the record blank 11 pass through the beam path, an information track may be formed comprising spaced disturbed regions of the absorptive layer which have been subjected to the high intensity beam exposure, separated by undisturbed regions of the absorptive layer that were not subject to such high intensity beam exposure.

FIG. 4 illustrates a portion of an information record where the record blank 11 of FIG. 3 is subjected to such controlled beam exposure. As shown in cross-section in FIG. 4, the information track comprises a succession of spaced disturbed regions $p_1$, $p_2$, $p_3$, $p_4$, separated by regions $u_1$, $u_2$, $u_3$, $u_4$ in which the surface of the absorptive layer 17 is undisturbed.

The effect of the choice of substrate layer material on the thermal efficiency of the recording process can be demonstrated with reference to two record blanks each having a similar thin platinum-cobalt absorptive layer overlying a metal substrate and silicon dioxide substrate respectively. Assuming an exposure time $\tau$ for the respective record blanks to be sufficient for a focused beam of light to effect a disturbance of a region of the absorptive layer, the heat energy which has dissipated into the substrate may be computed as:

$E_{substrate} \approx 2.5 \, l \, C_{sub} \, (T_m/2)$ for $2.5 \, l <$ substrate thickness,
where
$l$ is the thermal diffusion length for the substrate material; $C_{sub}$ is the specific heat for the substrate material; and $T_m$ is the disturbance effecting temperature for the absorptive layer.

Since the energy absorbed in the absorptive layer ($E_{layer}$) and required to effect disturbance of a given region of that layer is the same irrespective of substrate material, since in the examples presented the record blanks differ only in substrate material, then the thermal efficiency of the recording process can be computed as:

$$\text{Thermal Efficiency} = \frac{\text{Energy absorbed in absorptive layer}}{\text{Total recording energy}} = \frac{E_{layer}}{E_{layer} + E_{substrate}}$$

The results of such a computation of thermal efficiencies of recording for record blanks having respective metal and silicon dioxide substrates are illustrated in FIG. 5 for differing thickness of an absorptive platinum-cobalt layer. From these computations it is apparent that a decrease in the thermal efficiency of recording for a recording blank is realizable through the use of a substrate having a high thermal diffusivity constant.

The above results may be applied to the analysis of a composite substrate of the type described in the present invention, with the decrease in the thermal efficiency of the recording process lying at a value in between the illustrated curves depending on the easily controlled thickness of the silicon dioxide insulating layer with a conductive layer having a thickness of about one micron to thereby approximate the thermal effects of the conductive substrate and render the thermal effects of the substrate 13 negligible.

Two practical examples serve to illustrate the principles of the present invention. Given two record discs formed of respectively two absorptive materials such as manganese-bismuth (MnBi) and platinum-cobalt (PtCo), thin layers of which are directly deposited on respective disc-shaped glass substrates, the light intensity thresholds necessary to effect information recording were calculated with the following results:

| Material | Record Threshold |
| --- | --- |
| MnBi | 12 mW |
| PtCo | 70 mW |

Playback of these disc records with a desired signal-to-noise ratio of approximately 40 db was calculated to require the following minimum playback light intensities:

| Material | Playback Power |
| --- | --- |
| MnBi | 10 mW |
| PtCo | 200 mW |

While playback of the MnBi disc at the desired playback power level, on the one hand, is possible, it is clearly marginal and possible disturbance of the absorptive layer during playback, resulting in erasure of recorded information, is an ever present danger. Playback of the PtCo disc at the desired playback power level, on the other hand, is clearly impossible with the desired playback power being equivalent to almost three times the recording intensity.

Were these absorptive layers to be directly deposited on respective disc shaped aluminum substrates, the recording light intensity thresholds can be calculated as:

| Material | Record Threshold |
|---|---|
| MnBi | 175 mW |
| PtCo | 880 mW |

This dramatic increase in recording threshold intensity, due to the decrease in the thermal efficiency of the recording process, enables the playback of these discs with the aforementioned desired playback power intensity settings with no danger of information erasure. This decrease in recording sensitivity, however, far greater than that necessary for protecting the absorptive layers during playback, requiring an unnecessarily high record beam intensity. The interposition of an 800 Å thick silicon dioxide layer between the absorptive layer and the conductive layer, substantially as shown in FIG. 3, effects a reduction in the record intensity threshold power for the MnBi disc which can now be calculated to be 20 mW. In a similar fashion, a 330 Å thick silicon dioxide layer interposed between a PtCo absorptive layer and a conductive layer, effects a reduction in the record intensity threshold power which can now be calculated to be 233 mW.

These new recording threshold intensities provide a satisfactory margin of protection against erasure upon playback while at the same time reducing the required recording threshold intensity to readily realizable levels. Where other recording threshold intensities are desired, simple variations in the thickness of the insulating layer readily yields the desired result.

For an explanation of operation of the playback apparatus of FIG. 6, it may be assumed that the rotating disc 11 is of a recorded form as shown by the information record construction of FIG. 4.

The monochromatic light output of a laser 31, for example the light from a HeNe laser having an output wavelength of 6328 angstrom units, is passed through an intensity modulator 33 to a beam splitter 35. The intensity modulator 33 is driven by a modulator driver 36, which permits setting of the laser output at a constant intensity level determined by the signal-to-noise ratio required for the recovered information which, of course, is set safely below the level causing disturbance of the absorptive layer.

A lens 37 forms the light passed by beam splitter 35 into a beam which is directed towards a mirror 41 which reflects the beam onto the entrance aperture of a lens 43. The lens 43 focusses the light beam reflected by mirror 41 on the desired information track formed in the absorptive surface layer 17 of the disc 11. A lens translational drive mechanism 61 provides radial motion of the assembly 63 which comprises lens 43 and mirror 41). Mechanism 61 is chosen to be appropriate for scanning the form of information track desired to be played back. Light reflected from the information track is returned via elements 43, 41 and 37 to the beam splitter 35. The beam splitter 35 is a 50/50 beam splitter whereby 50% of the incident light is reflected and 50% transmitted. Thus 50% of the return light is directed to a photodetector 69 via an analyzer 71. The analyzer 71 is necessary to distinguish between the light from the disturbed and undisturbed regions. The analyzer is a polarizer with axis of extinction rotated at some angle $\theta$ corresponding to the angle of rotation of the axis of polarization effected by the disturbed regions on the light beam relative to original beam polarization direction.

The intensity of light falling upon the detector 69 alternates between a minimum level and a maximum level as the successive regions, $p_1$, $u_1$, $p_2$, $u_2$, etc., of the information track pass through the path of the focussed beam. Illustratively, in the present embodiment, the minimum intensity level for light reaching the detector 69 is obtained when an undisturbed region, $u_1$, $u_2$, etc., which effects no rotation of the axis of polarization of the incident beam of the absorptive layer 17 is in the focussed beam path, while the maximum intensity level for light reaching the detector 69 is obtained when a disturbed region, $p_1$, $p_2$, etc., effecting rotation of the axis of polarization of the incident beam by an angle $\theta$ is in the focussed beam path.

The output of detector 69 comprises carrier waves with zero crossings recurring at frequencies varying in consonance with the disturbed region edge spacing variations passing through the focussed beam path. The detector output is applied to a bandpass filter 73, which selectively passes signal components falling within the deviation range employed for the recording video signal and appropriate sidebands thereof. The output of bandpass filter 73 is applied via a limiter 75 which removes spurious amplitude modulation of the frequency modulated carrier waves, to the input of an FM demodulator 77, which recovers the recorded video signal information.

What is claimed is:

1. A record blank, for use with a playback focused beam of light of a given frequency and a first intensity and a recording focused beam of light of said given frequency and a second intensity, said second intensity being greater than said first intensity, said record blank comprising the combination of:
    a foundation;
    a coating of material exhibiting high thermal diffusivity, overlying a surface of said foundation; and
    a coating of material of a given thickness exhibiting absorptivity to light at said given frequency, overlying said coating of high thermal diffusivity;
    said coating of high thermal diffusivity presenting a significant heat sink to said absorptive coating;
    an absorptive coating of said given thickness being sensitive to a focused beam of light of said first intensity when such absorptive coating overlies said foundation such that said focused beam of light of said first intensity effects disturbances in such absorptive coating overlying said foundation;
    said record blank being sensitive to said recording beam of said second intensity such that said recording beam effects disturbances in said absorptive coating of said record blank, said absorptive coating of said record blank being undisturbed in response to a focused beam of light of said first intensity;
    said record blank exhibiting a given signal-to-noise ratio during playback with said playback beam at said first intensity.

2. A record blank in accordance with claim 1 wherein said foundation is in the form of a disc.

3. A record blank in accordance with claim 2 wherein said disc is formed of glass.

4. A record blank in accordance with claim 1 wherein said coating of high thermal diffusivity comprises:
   a layer of material having a thermal diffusivity constant which is larger by at least one order of magnitude relative to the thermal diffusivity constant of said foundation, overlying a surface of said foundation.

5. A record blank in accordance with claim 4, wherein the thickness of said layer of material is chosen such as to establish a desired rate of thermal conduction between said coating of light absorptive material and said foundation.

6. A record blank in accordance with claim 4 wherein said layer of material is formed of metal.

7. A record blank in accordance with claim 6 wherein said coating of light absorptive material is formed of manganese-bismuth.

8. A record blank in accordance with claim 1 wherein said coating of high thermal diffusivity comprises:
   a first layer of material having a large thermal diffusivity constant relative to the thermal diffusivity constant of said foundation, overlying a surface of said foundation; and
   a second layer of material having a small thermal diffusivity constant relative to the thermal diffusivity constant of said first layer of material, overlying said first layer of material.

9. A record blank in accordance with claim 8 wherein the thickness of said first layer of material relative to the thickness of said second layer of material is chosen such as to establish a desired rate of thermal conduction between said coating of light absorptive material and said foundation.

10. A record blank in accordance with claim 8 wherein said first layer of material is formed of metal.

11. A record blank in accordance with claim 10 wherein said coating of light absorptive material is formed of platinum-cobalt.

12. A record blank in accordance with claim 10 wherein said coating of light absorptive material is formed of manganese-bismuth.

* * * * *